(12) United States Patent
Chan

(10) Patent No.: US 11,491,651 B2
(45) Date of Patent: Nov. 8, 2022

(54) DATA COMMUNICATION NETWORK WITH GIGABIT PLASTIC OPTICAL FIBER FOR ROBOTIC ARM SYSTEM

(71) Applicant: The Boeing Company, Chicago, IL (US)

(72) Inventor: Eric Y. Chan, Mercer Island, WA (US)

(73) Assignee: The Boeing Company, Chicago, IL (US)

( * ) Notice: Subject to any disclaimer, the term of this patent is extended or adjusted under 35 U.S.C. 154(b) by 294 days.

(21) Appl. No.: 16/807,193

(22) Filed: Mar. 3, 2020

(65) Prior Publication Data

US 2021/0276184 A1    Sep. 9, 2021

(51) Int. Cl.
| | |
|---|---|
| *H04B 10/40* | (2013.01) |
| *H04J 14/02* | (2006.01) |
| *B25J 9/16* | (2006.01) |
| *G02B 6/02* | (2006.01) |
| *G02B 6/42* | (2006.01) |
| *H04B 10/25* | (2013.01) |

(52) U.S. Cl.
CPC ........... *B25J 9/1635* (2013.01); *B25J 9/1694* (2013.01); *G02B 6/02038* (2013.01); *G02B 6/4246* (2013.01); *H04B 10/25* (2013.01); *H04B 10/2589* (2020.05); *H04B 10/40* (2013.01); *H04J 14/02* (2013.01)

(58) Field of Classification Search
CPC ................................ H04B 10/40; H04J 14/02
See application file for complete search history.

(56) References Cited

U.S. PATENT DOCUMENTS

| | | | |
|---|---|---|---|
| 9,438,338 B1 | 9/2016 | Chan et al. | |
| 10,447,423 B2 | 10/2019 | Chan et al. | |
| 10,500,668 B2 | 12/2019 | Yoshida et al. | |
| 10,500,735 B1 | 12/2019 | Menon et al. | |
| 10,574,359 B2 | 2/2020 | Chan et al. | |
| 2002/0145113 A1* | 10/2002 | Sullivan ................ | B82Y 10/00 250/311 |

(Continued)

OTHER PUBLICATIONS

Polley et al., "40Gbps links using plastic optical fiber", OSA/OFC 2007 (Year: 2007).*

(Continued)

*Primary Examiner* — Shi K Li
(74) *Attorney, Agent, or Firm* — Ostrager Chong Flaherty & Broitman P.C.

(57) ABSTRACT

A robotic arm system comprising an artificial intelligence (AI) processor system, a transceiver electrically coupled to the AI processor system, and a robotic arm having an optical data communication network that communicates with the transceiver. The robotic arm further comprises a transmitter, a plurality of sensors electrically coupled to the transmitter, a receiver, and a plurality of motion actuators electrically coupled to the receiver. The optical data communication network comprises gigabit plastic optical fiber (GbPOF) having a graded-index core made of a transparent carbon-hydrogen bond-free perfluorinated polymer with dopant. In one embodiment, one GbPOF optically couples the transmitter to the transceiver and another GbPOF optically couples the transceiver to the receiver. The flexible high-data-rate GbPOF enables robotic arm control using artificial intelligence.

19 Claims, 6 Drawing Sheets

(56) References Cited

U.S. PATENT DOCUMENTS

| | | | |
|---|---|---|---|
| 2007/0092657 A1* | 4/2007 | Ferguson | B05B 16/60 |
| | | | 427/372.2 |
| 2015/0230207 A1* | 8/2015 | Wang | H04N 7/185 |
| | | | 370/329 |
| 2020/0333881 A1* | 10/2020 | Tee | G06F 3/014 |

OTHER PUBLICATIONS

Zheng et al., "Investigating the Strain, Temperature and Humidity Sensitivity of a Multimode Graded-Index Perfluorinated Polymer Optical Fiber with Bragg Grating", Sensors vol. 18, Issue 5, MDPI, May 2018 (Year: 2018).*
Peng et al., "Development of special polymer optical fibers and devices", Proc. of SPIE, vol. 5595, 2004 (Year: 2004).*
Fontex Plastic Optical Fiber, New Product Introduction, Asahi Glass Co., Ltd. (2010).
Firecomms, "Robotic & Cobotic applications and the use of Plastic Optical Fiber" (2019).
Marszalec et al., "Lasers and optical fibres in robotics", The Industrial Robot, Sep. 1990.

* cited by examiner

DATA COMMUNICATION NETWORK WITH GIGABIT PLASTIC OPTICAL FIBER FOR ROBOTIC ARM SYSTEM

BACKGROUND

The technology disclosed herein generally relates to robot controllers and, in particular, relates to robot controllers which are capable of learning an optimal robot operation using artificial intelligence.

The future generation of robots used in airplane manufacturing will need to be multifunctional, highly accurate, and able to perform self-learning with minimum human interactions. One promising technology for enabling these capabilities is by implementing artificial intelligence (AI) in robots used in airplane manufacturing. Implementation of AI in an airplane production robot will require a large amount of data transfer instantaneously between the robotic motion controller and the robot's complex sensor systems. This requires a very high-data-rate communication network to be installed in the airplane manufacturing robot.

Robotic systems using copper cables for control and communication in a large airplane factory: suffer from noise and electromagnetic interference (EMI); have limited data throughput capability to support sophisticated AI implementation; and are heavy and bulky (which increases power consumption during robot operation). In addition, copper cables used in robotic system in a large airplane factory may suffer from corrosion and dirt contamination due to the harsh factory environment. The existing solution is to heavily shield the copper cables used in a robotic system, but the drawback is further increase in the size and weight of the robot. Due to data throughput limits, typical airplane manufacturing robotic systems do not use AI. Additional covers may be used to prevent cable corrosion. However, handling covers increases the labor and time involved in maintaining the robotic system.

The state of the art may be advanced by providing a communication network capable of transferring data between a robotic arm and an AI processor system with high data throughput.

SUMMARY

The subject matter disclosed in detail below is directed to a robotic arm system comprising an artificial intelligence (AI) processor system, a transceiver electrically coupled to the AI processor system, and a robotic arm having an optical data communication network that communicates with the transceiver. The robotic arm further comprises a transmitter, a plurality of sensors electrically coupled to the transmitter, a receiver, and a plurality of motion actuators electrically coupled to the receiver. The optical data communication network comprises gigabit plastic optical fiber (GbPOF) having a graded-index core made of a transparent carbon-hydrogen bond-free perfluorinated polymer with dopant. In one embodiment, one GbPOF optically couples the transmitter to the transceiver and another GbPOF optically couples the transceiver to the receiver.

As used herein, the term "transmitter" means an electro-optical transmitter that converts electrical signals into optical signals. As used herein, the term "receiver" means an opto-electrical receiver that converts optical signals into electrical signals. As used herein, the term "transceiver" means a device that includes both a transmitter and a receiver. As used herein, the term "wavelength" in the context of coherent laser light of narrow bandwidth means the wavelength having maximum intensity (a.k.a. "center wavelength").

In accordance with one embodiment, each GbPOF is capable of transferring optical digital data at a rate of up to 100 Gbits/sec. The use of flexible high-data-rate GbPOF enables robotic arm control using artificial intelligence. This overcomes the limitation of copper cable bandwidth. In addition, GbPOF is non-metallic material, thereby avoiding any problems with noise, EMI, and corrosion in a factory environment. Also, GbPOF is light weight, thereby reducing the size, weight, and power consumption of the robot as compared to robots equipped with copper cables only.

Although various embodiments of a robotic arm system having a high-throughput data transfer network that employs GbPOF are described in some detail later herein, one or more of those embodiments may be characterized by one or more of the following aspects.

One aspect of the subject matter disclosed in detail below is a robotic arm system comprising: an AI processor system; a transceiver electrically coupled to the AI processor system; a robotic arm comprising a transmitter, first and second sensors electrically coupled to the transmitter, a receiver, first and second motion actuators electrically coupled to the receiver, and an optical data communication network comprising a first GbPOF which optically couples the transmitter to the transceiver and a second GbPOF which optically couples the transceiver to the receiver. The transmitter comprises first and second transmit channels capable of converting electrical signals received from the first sensor into optical signals having respective (first and second) wavelengths. The receiver comprises first and second receive channels capable of converting received optical signals having the first and second wavelengths respectively into electrical signals which are respectively sent to the first and second motion actuators. The robotic arm comprises first through L-th arm links rotatably coupled in series and an end effector movably coupled to the L-th arm link, where L is an integer equal to or greater than 2. The transmitter, sensors, receiver, and motion actuators are mounted to the L-th arm link. The motion actuators are configured to actuate respective motions of the end effector relative to the L-th arm link.

In accordance with some embodiments of the robotic arm system described in the immediately preceding paragraph, the transmitter further comprises an optical multiplexer optically coupled and configured to multiplex the first and second optical signals from the first and second transmit channels into the first gigabit plastic optical fiber; and the receiver further comprises an optical de-multiplexer optically coupled and configured to de-multiplex the first and second received optical signals from the second GbPOF into the first and second receive channels respectively. The first and second gigabit plastic optical fibers each have a graded-index core made of a transparent carbon-hydrogen bond-free perfluorinated polymer with dopant.

Another aspect of the subject matter disclosed in detail below is a robotic arm system comprising: a robotic arm comprising a transmitter, first through M-th sensors electrically coupled to the transmitter, a receiver, and first through N-th motion actuators electrically coupled to the receiver, where M and N are integers equal to or greater than 2; an AI processor system; a transceiver electrically coupled to the AI processor system; and an optical data communication network comprising a first GbPOF which optically couples the transmitter to the transceiver and a second GbPOF which optically couples the transceiver to the receiver. The transmitter comprises first through M-th transmit channels capable of converting electrical signals respectively received from the first through M-th sensors into first through M-th optical signals having first through M-th wavelengths respectively and each having a data rate capability of at least 20 gigabits per second. The receiver comprises first through N-th receive channels capable of converting first through N-th received optical signals having first through N-th wavelengths respectively into electrical signals sent to the first through N-th motion actuators, each of the first through N-th receive channels having a data rate capability of at least 20 gigabits per second. The robotic arm comprises first through L-th arm links rotatably coupled in series and an end effector movably coupled to the L-th arm link, where L is an integer equal to or greater than 2. The transmitter, first through M-th sensors, receiver, and first through N-th motion actuators are mounted to the L-th arm link. The first through N-th motion actuators are configured to actuate respective motions of the end effector relative to the L-th arm link.

In accordance with some embodiments of the robotic arm system described in the immediately preceding paragraph, the transceiver comprises: first through N-th transceiver transmit channels capable of converting electrical signals received from the AI processor system into the first through N-th transmitted optical signals at a data rate of at least 20 gigabits per second per channel; and first through M-th transceiver receive channels capable of converting the first through M-th optical signals at a data rate of at least 20 gigabits per second per channel into electrical signals sent to the AI processor system.

In addition, the transmitter further comprises an optical multiplexer optically coupled and configured to multiplex the first through M-th optical signals from the first through M-th transmit channels into the first gigabit plastic optical fiber; and the receiver further comprises an optical de-multiplexer optically coupled and configured to de-multiplex the first through N-th received optical signals into the first through N-th receive channels respectively. The first and second gigabit plastic optical fibers each have a graded-index core made of a transparent carbon-hydrogen bond-free perfluorinated polymer with dopant. In accordance with one proposed implementation, N equals five and the first through N-th wavelengths are 980, 1271, 1291, 1311, and 1331 nm respectively.

A further aspect of the subject matter disclosed in detail below is a robotic arm comprising: first through L-th arm links rotatably coupled in series, where L is an integer equal to or greater than 2; an end effector movably coupled to the L-th arm link; a transmitter mounted to the L-th arm link; first through M-th sensors mounted to the L-th arm link and electrically coupled to the transmitter, where M is an integer equal to or greater than 2; a receiver mounted to the L-th arm link; first through N-th motion actuators mounted to the L-th arm link and electrically coupled to the receiver, where N is an integer equal to or greater than 2; a first GbPOF optically coupled to the transmitter; and a second GbPOF optically coupled to the receiver. In accordance with one proposed implementation, the first through N-th sensors comprise a proximity sensor, a tactile sensor, a temperature sensor, a humidity sensor, and a pressure sensor. The first and second gigabit plastic optical fibers each have a graded-index core made of a transparent carbon-hydrogen bond-free perfluorinated polymer with dopant.

Yet another aspect of the subject matter disclosed in detail below is a method for operating a robotic arm system, the method comprising: acquiring sensor data using a multiplicity of sensors mounted to a robotic arm; transmitting the sensor data from a transmitter incorporated in the robotic arm to an AI processor system external to the robotic arm via a first gigabit plastic optical fiber; processing the sensor data using artificial intelligence to analyze the sensor data, compute robotic arm motion, and generate motion commands; and transmitting the motion commands from the AI processor system to a receiver incorporated in the robotic arm via a second gigabit plastic optical fiber.

Other aspects of a robotic arm system having a high-throughput data transfer network that employs gigabit plastic optical fiber are disclosed below.

BRIEF DESCRIPTION OF THE DRAWINGS

The features, functions and advantages discussed in the preceding section may be achieved independently in various embodiments or may be combined in yet other embodiments. Various embodiments will be hereinafter described with reference to drawings for the purpose of illustrating the above-described and other aspects. None of the diagrams briefly described in this section are drawn to scale.

Reference will hereinafter be made to the drawings in which similar elements in different drawings bear the same reference numerals.

DETAILED DESCRIPTION

Figure 1:
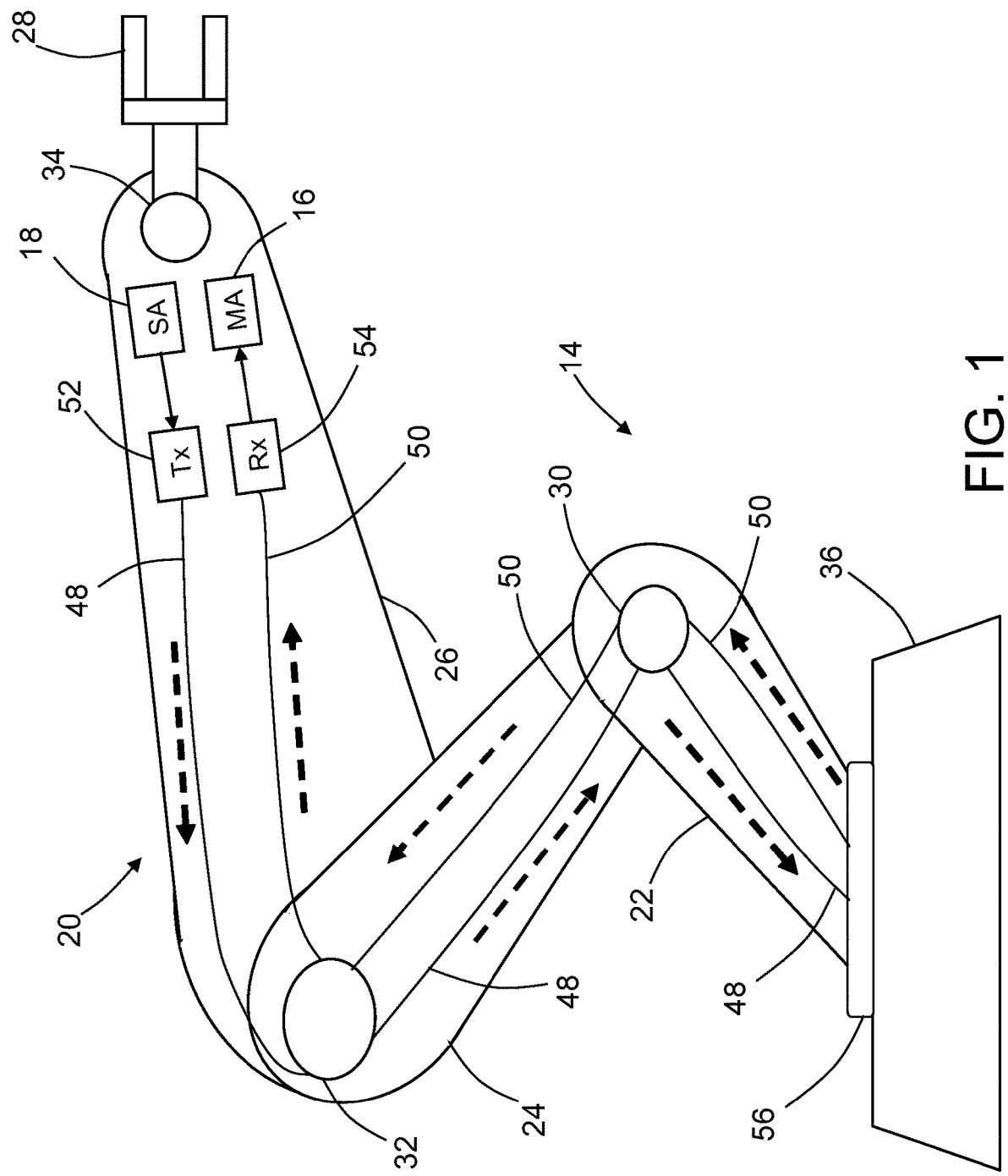
FIG. 1 is a diagram depicting a communication system that uses graded-index plastic optical fibers instead of an electrical bus to connect sensors and motion actuators of a robotic arm to a robotic arm controller, such as a computer which is programmed to control the robotic arm based on principles of artificial intelligence and machine learning.

Illustrative embodiments of a robotic arm system having a high-throughput data transfer network that employs gigabit plastic optical fiber are described in some detail below. However, not all features of an actual implementation are described in this specification. A person skilled in the art will appreciate that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

An optical fiber is a cylindrical dielectric waveguide that transmits light along its axis. The fiber consists of a transparent core surrounded by a transparent cladding layer (hereinafter "cladding"), both of which are made of dielectric materials. Light is kept in the core by the phenomenon of total internal reflection. To confine the optical signal in the core, the refractive index of the core is greater than that of the cladding. The boundary between the core and cladding may either be abrupt, as in step-index fiber, or gradual, as in graded-index fiber. Optical fibers can be made of glass or plastic. Plastic optical fiber can be substituted for copper conductors in robotic systems to reduce size, weight and power.

One prior solution used plastic optical fibers made of polymethyl methacrylate (PMMA), which is a transparent and rigid plastic material. Plastic optical fiber made of PMMA is a step-index large-diameter plastic optical fiber. The bandwidth for robotic applications has a limit of about 125 Mbits/sec, which will not support the future development of sophisticated AI implementations in robotic systems. In contrast, this disclosure proposes the use of plastic optical fiber that is capable of supporting 100 Gbits/sec operation in an optical communication link having a length of 50 meters, which capability will support the high-data-throughput requirement of any advanced AI implementation.

A plastic optical fiber capable of transmitting data at rates faster than 1 gigabits per second will be referred to herein as a "gigabit plastic optical fiber" (GbPOF). A commercially available GbPOF is the "Fontex" GbPOF from Asahi Glass Co., Ltd., which has a core and cladding made of transparent carbon-hydrogen bond-free perfluorinated polymer. The chemical composition of the base polymer for this product ("Fontex" plastic optical fiber) is a chain consisting of a repeating unit in the form of a molecule having six carbon atoms, one oxygen atom, and ten fluorine atoms. The perfluorinated polymer has fluorine atoms bonded to the carbon atoms instead of having hydrogen atoms bonded to the carbon atoms.

Basically, the aforementioned commercially available GbPOF is made of long chains of polymers. These polymer chains create strong forward mode coupling and result in less reflected light that can interfere with the laser source. The strong mode coupling in a GbPOF core also reduces the coherency of the laser source and results in minimal modal interference along the fiber length. In addition, dopant is mixed in the polymer chains to form a doped polymer matrix. The polymers of the GbPOF are chemically bonded, but the dopant is not chemically bonded to the polymers. In general, in the case of GbPOF, the dopant molecules are impurities intentionally introduced to the GbPOF polymer chains during the GbPOF fabrication process. What enables a graded-index GbPOF to operate at a high data rate is dopant that is distributed in the center of the core of the GbPOF with a gradient (or Gaussian) index profile.

A plastic optical fiber having a graded-index core made of perfluorinated polymer enables higher data rates when used in large-capacity communication systems such as an AI implementation of a robotic arm system. In addition, the perfluorinated polymer is ductile, flexible, durable, and does not break during tight cable bending, thereby preventing breakage during robot motion. More specifically, GbPOF made of perfluorinated polymer is capable of forming a very small bend radius and will not suffer from torsional stress. Thus, GbPOF is suitable for use in future robotic arm systems that will require high-data-rate communications between the sensors and actuators installed in the robotic arm near the end effector and an artificial intelligence processor located external to the robotic arm. The GbPOF technology proposed herein may be used in future airplane manufacturing robotic systems to reduce the labor cost of airplane production. This technology may also be used in military and space programs that require advanced artificial intelligence implementation.

Artificial intelligence (AI) is steadily progressing toward advanced, high-value robotic applications that will have a profound impact on future advanced automated airplane manufacturing processes. AI software—such as neural network software implemented with machine learning or deep learning algorithms—installed in an airplane production robot requires high-performance "artificial brains" hardware. Adding computer vision to robotic system is fundamental to many complex, safety-critical decision-making processes. Future robotic systems used in airplane factories will require a very high data throughput from the AI processor to the motion actuators of the robot that performs the complex airplane production processes. It is expected that a data throughput rate of 100 Gbits/sec will be required in order to implement a robotic arm system that moves in response to commands from an artificial intelligence processor.

In accordance with the implementation proposed herein, the communications of the AI processor to the robotic arm motion actuators are implemented with 100-Gbit/sec wavelength division multiplexing (WDM) transceivers (or transmitters and receivers) optically coupled by means of GbPOF. In fiber-optic communications, WDM is a technology which multiplexes a number of optical carrier signals onto a single optical fiber by using different wavelengths (i.e., colors) of laser light. This technique enables bidirectional communications over one or two strands of fiber, as well as multiplication of capacity. A WDM system uses a multiplexer at the transmitter to join the several signals together and a de-multiplexer at the receiver to split them apart.

FIG. 1 is a diagram representing a side view of a robotic arm system 14 equipped with an optical digital data transfer bus in the form of a pair of GbPOF 48 and 50 in accordance with one embodiment. The robotic arm system 14 depicted in FIG. 1 comprises a pedestal 36 and a robotic arm 20 that is rotatably mounted to the pedestal 36. The pedestal 36 may house an artificial intelligence processing system (RIPS) (not visible in FIG. 1, but see RIPS 40 in FIG. 2) or may be communicatively coupled to an external RIPS. FIG. 1 shows the approach to route a pair of GbPOF 48 and 50 through the robotic arm 20 for communicating signals from a plurality of robotic arm-mounted sensors to the RIPS and from the RIPS to a plurality of robotic arm motion actuators. Because of the highly flexible GbPOF, the 100-Gbits/sec optical signal that is routed inside the robotic arm system will not be affected by the highly repetitive arm motions. In addition, because the GbPOF is not conductive, the high-data-rate optical signal that is routed through the GbPOF will not be adversely affected by EMI and noise at levels typical of a large airplane factory having multiple airplane production lines which are running simultaneously.

In the example depicted in FIG. 1, the robotic arm 20 comprises: a carousal 56 which is rotatably coupled to the pedestal 36; a first arm link 22 which has one end affixed to the carousal 56; a second arm link 24 which has one end pivotably coupled to the other end of the first arm link 22 by means of a first revolute joint 30; a third arm link 26 which has one end pivotably coupled to the other end of the second arm link 24 by means of a second revolute joint 32; and an end effector 28 which is pivotably coupled to the other end of the third arm link 26 by means of a third revolute joint 34.

Still referring to FIG. 1, the robotic arm 20 further includes a transmitter 52 (TX), a sensor array 18 (SA) including a plurality of sensors which are electrically coupled to the transmitter 52, a receiver 54 (RX), and a plurality of motion actuators 16 (MA) which are electrically coupled to the receiver 54. The transmitter 52, sensor array 18, receiver 54, and plurality of motion actuators 16 are mounted to a distal end of the third arm link 26 in the vicinity of the end effector 28.

The plurality of motion actuators 16 are configured to actuate respective motions of the end effector 28 relative to the third arm link 26. For example, each motion actuator may include an electric motor that drives a particular motion (translational or rotational) of the end effector 28 and a motor controller that is communicatively coupled to receive motion commands from the AIPS 40 via the GbPOF 50.

The sensor array 18 is configured to measure various operational parameters that may affect the performance of the robot during execution of an automated aircraft production operation, such as painting the fuselage of an airplane. The electrical signals representing analog sensor data output by the plurality of sensors 18 are converted to electrical signals representing digital sensor data by analog-to-digital converters (not shown in the drawings). The transmitter 52 then converts the electrical digital sensor data into optical digital sensor data, which is sent to the AIPS 40 via the Gb POF 48.

Although the robotic arm 20 depicted in FIG. 1 has three arm links, more generally the robotic arm may comprise first through L-th arm links rotatably coupled in series and an end effector 28 movably coupled to the L-th arm link, where L is an integer equal to or greater than 2. The transmitter 52, sensor array 18, receiver 54, and motion actuators 16 are mounted to the L-th arm link. The motion actuators 16 are configured to actuate respective motions of the end effector 28 relative to the L-th arm link. In addition, the sensor array 18 may include first through M-th sensors electrically coupled to the transmitter 52, whereas the plurality of motion actuators 16 includes first through N-th motion actuators electrically coupled to the receiver 54, where M and N are integers equal to or greater than 2.

Figure 2:
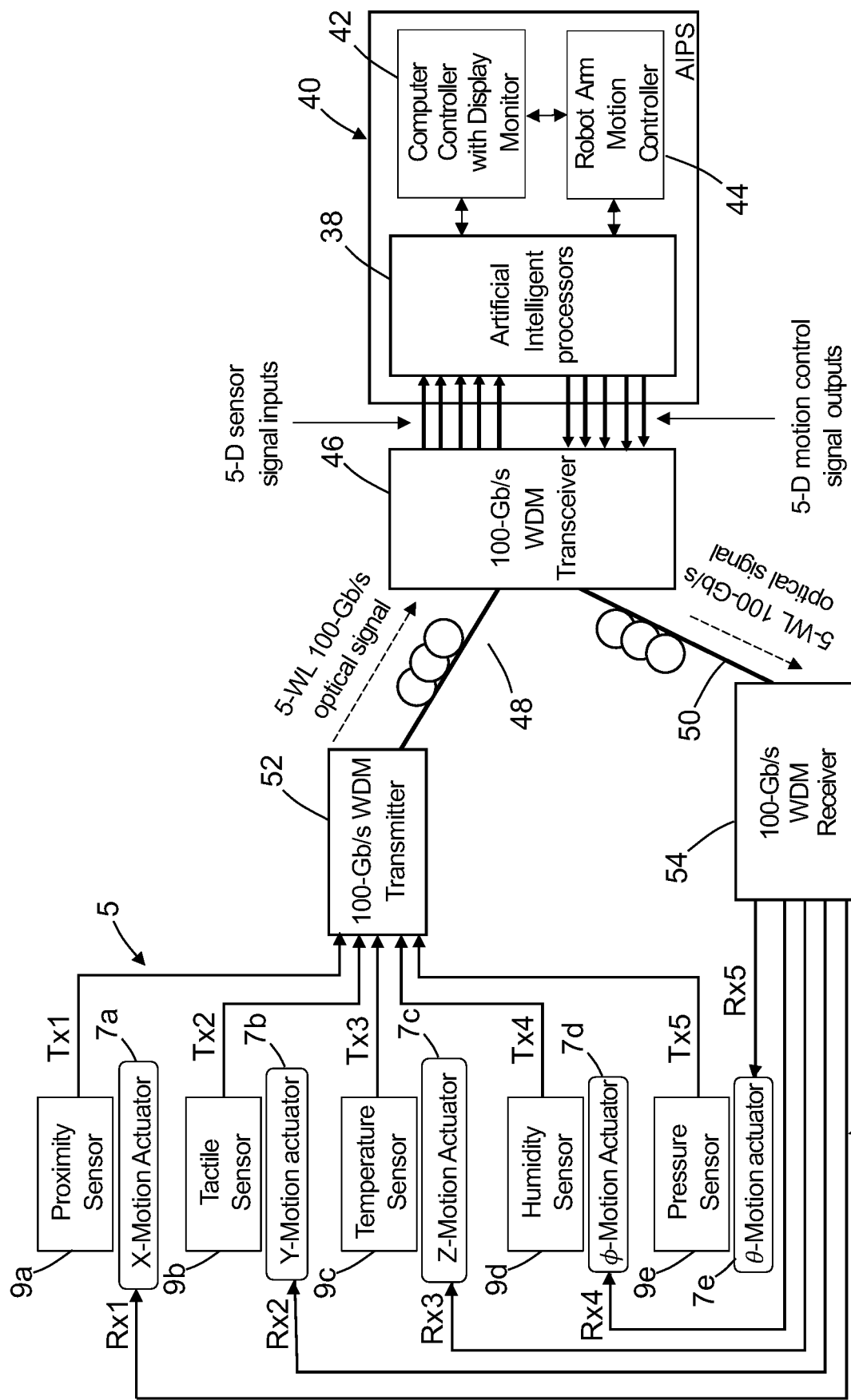
FIG. 2 is a block diagram identifying some components of a robotic arm system having a high-data-throughput optical data transfer network in accordance with one example embodiment.

FIG. 2 is a block diagram identifying some components of a robotic arm system having a high-data-throughput optical data transfer network in accordance with one exemplary embodiment. As previously shown in FIG. 1, the GbPOF 48 and 50 (and associated optical couplers and optical connectors not shown) form a data communication network in which GbPOF 48 optically couples the transmitter 52 to a transceiver 46 that is electrically coupled to the AIPS 40 and GbPOF 50 optically couples the transceiver 46 to the receiver 54.

In the example depicted in FIG. 2, the number of sensors M=5 and the number of motion actuators N=5. More specifically, the sensor array 18 includes the following sensors: a proximity sensor 9a that incorporates a camera for determining a location of the end effector 26; a tactile sensor 9b that determines when the end effector 26 is in contact with a workpiece; a temperature sensor 9c that determines the temperature of the environment in which the workpiece or object resides; a humidity sensor 9d that determines the humidity of the environment in which the workpiece or object resides; and a pressure sensor 9e that determines the air pressure in the environment in which the workpiece or object resides. These sensors are collectively referred to hereinafter as "sensors 9a-9e". Sensors 9a-9e send respective electrical signals TX1-TX5 representing sensor data to transmitter 52 via electrical wires 5.

In the example depicted in FIG. 2, the number of motion actuators N=5. More specifically, the plurality of motion actuators 16 includes the following motion actuators: an X-motion actuator 7a which actuates translational motion of the end effector 28 in a direction parallel to an X axis of a frame of reference; a Y-motion actuator 7b which actuates translational motion of the end effector 28 in a direction parallel to an Y axis of the frame of reference; a Z-motion actuator 7c which actuates translational motion of the end effector 28 in a direction parallel to a Z axis of the frame of reference; a φ-motion actuator 7d which actuates rotational motion of the end effector 28 about a roll axis (e.g., the X axis); and a θ-motion actuator 7e which actuates rotational motion of the end effector 28 about a pitch axis (e.g., the Y axis). These motion actuators are collectively referred to hereinafter as "motion actuators 7a-7e". Motion actuators 7a-7e receive respective electrical motion control signals RX1-RX5 from receiver 54 via electrical wires 3.

In accordance with the embodiment depicted in FIG. 2, the transmitter 52 is a 100-Gbits/sec WDM transmitter that is configured to receive respective electrical signals TX1-TX5 representing sensor data from the sensors 9a-9e and then transmit wavelength division-multiplexed sensor data to transceiver 52 via GbPOF 48 in the form of optical signals having five different wavelengths $\lambda_1$ to $\lambda_5$. The sensors 9a-9e output electrical signals representing analog sensor data, which analog sensor data is converted to digital sensor data by analog-to-digital converters (not shown in FIG. 2). Because the GbPOF 48 is capable of transferring data at a rate up to 100 Gbits/sec, the sensor data acquired by each of the five sensors 9a-9e may be transferred at a rate of 20 Gbits/sec.

Figure 3:
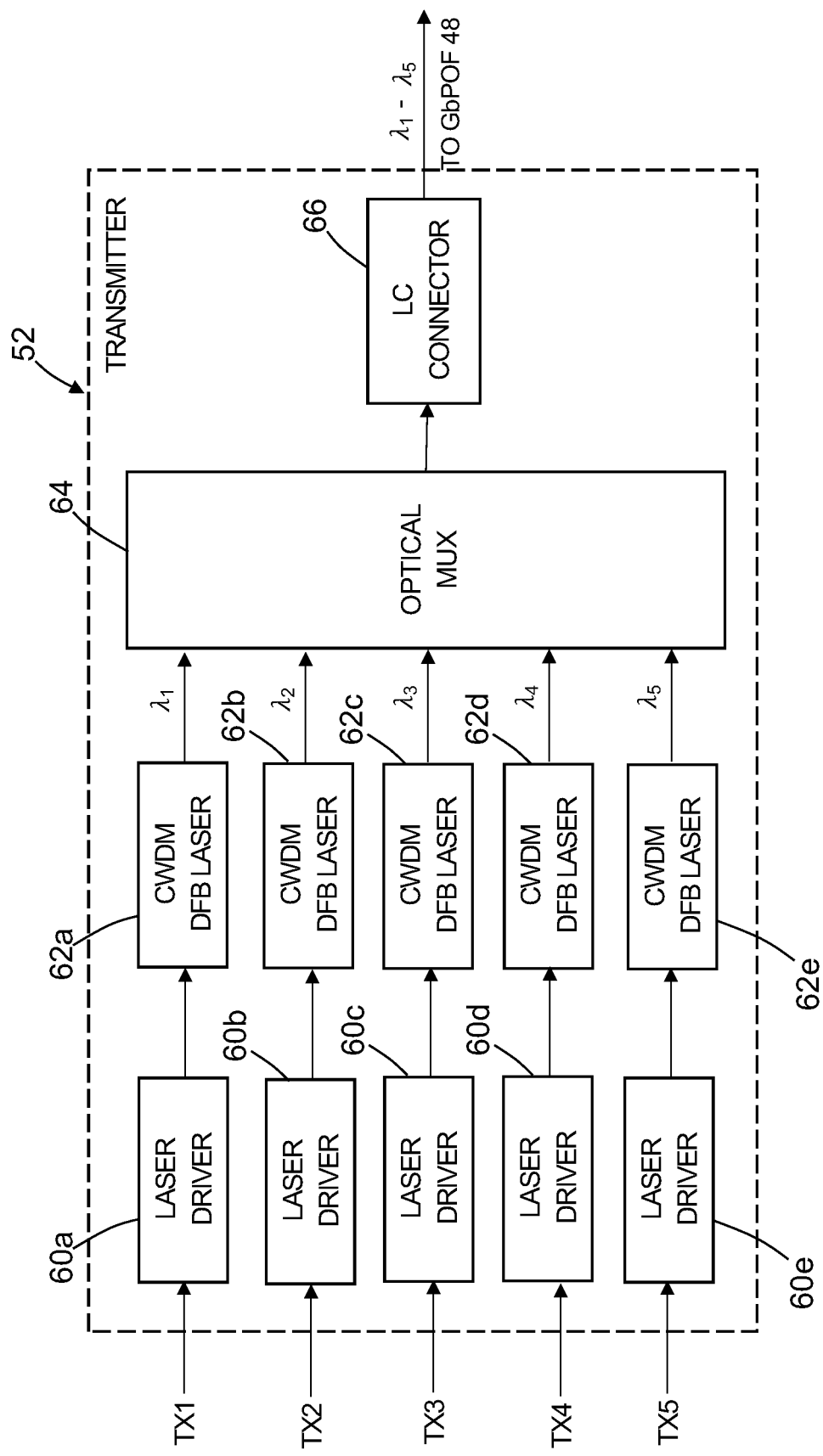
FIG. 3 is a block diagram identifying some components of a transmitter of the robotic arm of the robotic arm system partly depicted in FIG. 2.

FIG. 3 is a block diagram identifying some components of the transmitter 52 identified in FIG. 2. The digital sensor data streams TX1-TX5 are input to respective transmit channels of transmitter 52, each transmit channel being configured to transfer data accurately at a rate of up to 20 Gbits/sec. Each transmit channel of the transmitter 52 includes a respective laser driver and a respective continuous wavelength division multiplexing, distributed feedback laser (hereinafter "CWDM DFB laser") capable of emitting light having a respective different wavelength. More specifically, the first transmit channel comprises a laser driver 60a that receives digital sensor data TX1 and then drives a CWDM DFB laser 62a to output an optical signal of wavelength $\lambda_1$ that is modulated to carry the digital information contained in the electrical signal TX1. The second transmit channel comprises a laser driver 60b that receives digital sensor data TX2 and then drives a CWDM DFB laser 62b to output an optical signal of wavelength $\lambda_2$ that is modulated to carry the digital information contained in the electrical signal TX2. The third transmit channel comprises a laser driver 60c that receives digital sensor data TX3 and then drives a CWDM DFB laser 62c to output an optical signal of wavelength $\lambda_3$ that is modulated to carry the digital information contained in the electrical signal TX3. The fourth transmit channel comprises a laser driver 60d that receives digital sensor data TX4 and then drives a CWDM DFB laser 62d to output an optical signal of wavelength $\lambda_4$ that is modulated to carry the digital information contained in the electrical signal TX4. The fifth transmit channel comprises a laser driver 60e that receives digital sensor data TX5 and then drives a CWDM DFB laser 62e to output an optical signal of wavelength $\lambda_5$ that is modulated to carry the digital information contained in the electrical signal TX5.

For example, in accordance with one proposed implementation having five sensors, the CWDM DFB lasers 62a-62e are configured to emit at the following five wavelengths: $\lambda_1=980$ nm, $\lambda_2=1271$ nm, $\lambda_3=1291$ nm, $\lambda_4=1311$ nm, and $\lambda_5=1331$ nm.

The transmitter 52 further includes an optical multiplexer 64 that receives the optical signals of wavelengths $\lambda_1$ to $\lambda_5$ and optically multiplexes the five optical signals to form a five-wavelength division-multiplexed optical data stream that is input to one end of the GbPOF 48 (not shown in FIG. 3), which one end is held by an LC connector 66. The GbPOF 48 guides the five-wavelength optical data stream to the receiver of the transceiver 46 (see FIG. 2).

In accordance with the embodiment depicted in FIG. 2, the transceiver 46 is a 100-Gbits/sec WDM transceiver that is configured to de-multiplex the optical signals having the respective wavelengths $\lambda_1$ to $\lambda_5$ received from transmitter 52 and then convert those de-multiplexed optical signals into respective electrical signals. Those electrical signals are in turn output to an artificial intelligence processing system 40 (hereinafter "AIPS 40") for processing using artificial intelligence software. More specifically, the transceiver 46 includes five receive channels (not shown in FIG. 2) which respectively convert the optical signals of wavelengths $\lambda_1$ to $\lambda_5$ into electrical sensor signals which are output to the AIPS 40. The AIPS 40 processes the sensor data and then sends electrical signals representing motion control signals back to the transceiver 46. The transceiver 46 further includes five transmit channels which respectively convert electrical motion control signals output by the AIPS 40 into optical signals of respective wavelengths $\lambda_1$ to $\lambda 5$, which optical signals are sent to the receiver 54 via GbPOF 50. The transmitter portion of the transceiver 46 may have structure and functionality identical to the structure and functionality of the transmitter 52 shown in FIG. 3; the receiver portion of the transceiver 46 may have structure and functionality identical to the structure and functionality of the receiver 54 shown in FIG. 4. The transceiver 46 is capable of transmitting and receiving data at total data rates as high as 100 Gbits/sec, which matches the data rate capability of the GbPOF 48 and 50.

In accordance with the embodiment depicted in FIG. 2, the receiver 54 is a 100-Gbits/sec WDM receiver that is configured to receive wavelength division-multiplexed optical signals having respective wavelengths $\lambda_1$ to $\lambda_5$ from transceiver 46 via GbPOF 50 and then transmit respective electrical motion control signals RX1-RX5 to the motion actuators 7a-7e. Because the GbPOF 50 is capable of transferring data at a rate up to 100 Gbits/sec, the motion control data sent to each of the five motion actuators 7a-7e may be transferred at a rate of 20 Gbits/sec.

Figure 4:
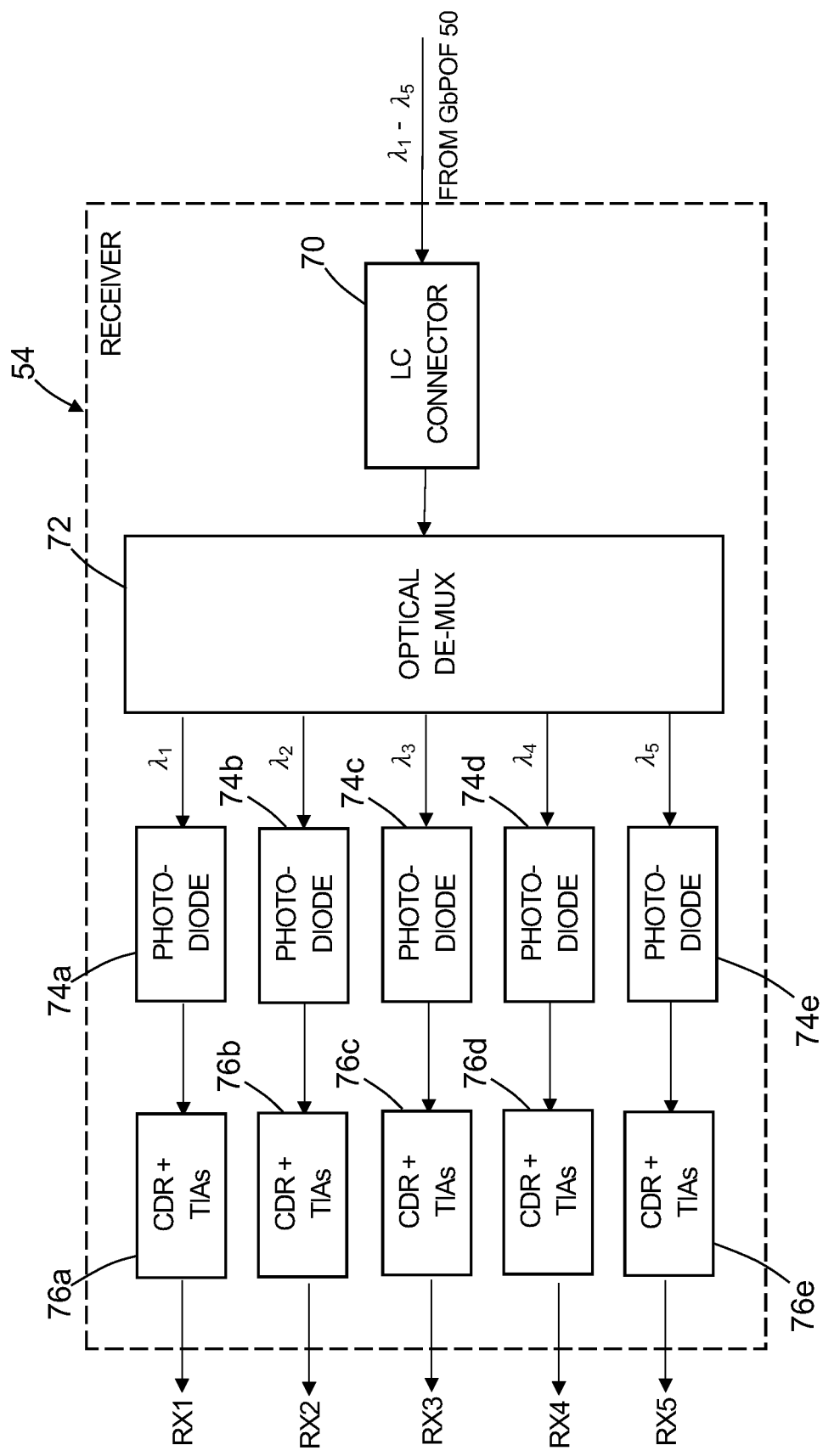
FIG. 4 is a block diagram identifying some components of a receiver of the robotic arm of the robotic arm system partly depicted in FIG. 2.

FIG. 4 is a block diagram identifying some components of the receiver 54 identified in FIG. 2. The receiver 54 includes an LC connector 70 that receives one end of the GbPOF 50 (not shown in FIG. 4). The receiver 54 further includes an optical de-multiplexer 72 that receives the five-wavelength division-multiplexed optical data stream from GbPOF 50 and de-multiplexes that wavelength division-multiplexed optical signal to re-form the five separate optical signals having respective wavelengths $\lambda_1$ to $\lambda_5$. Those optical signals contain information representing motion control signals generated by the AIPS 40 and intended for motion actuators 7a-7e respectively. Each receive channel of the receiver 54 includes a respective photodiode, respective clock and data recovery (CDR) circuitry, and respective transimpedance amplifier (TIA) circuitry (hereinafter "CDR/TIA circuitry"). Each receive channel is configured to convert a respective optical signal into a respective electrical motion control signal. More specifically, the first receive channel comprises a photodiode 74a that receives the optical signal of wavelength $\lambda_1$ and converts that optical signal into an electrical signal that is conditioned and amplified by CDR/TIA circuitry 76a to form motion control signal RX1 intended for X-motion actuator 7a. The second receive channel comprises a photodiode 74b that receives the optical signal of wavelength $\lambda_2$ and converts that optical signal into an electrical signal that is conditioned and amplified by CDR/TIA circuitry 76b to form motion control signal RX2 intended for Y-motion actuator 7b. The third receive channel comprises a photodiode 74c that receives the optical signal of wavelength $\lambda_3$ and converts that optical signal into an electrical signal that is conditioned and amplified by CDR/TIA circuitry 76c to form motion control signal RX3 intended for Z-motion actuator 7c. The fourth receive channel comprises a photodiode 74d that receives the optical signal of wavelength $\lambda_4$ and converts that optical signal into an electrical signal that is conditioned and amplified by CDR/TIA circuitry 76d to form motion control signal RX4 intended for $\phi$-motion actuator 7d. The fifth receive channel comprises a photodiode 74e that receives the optical signal of wavelength $\lambda_5$ and converts that optical signal into an electrical signal that is conditioned and amplified by CDR/TIA circuitry 76e to form motion control signal RX5 intended for $\theta$-motion actuator 7e. After receiving commands from the 100-Gbit WDM receiver 54, the motion actuator for each degree of freedom of the end effector 28 will cause the end effector 28 to translate and rotate in accordance with received motion commands.

Referring again to FIG. 2, the AIPS 40 includes AI processors 38, a computer controller 42 with display monitor, and a robotic arm motion controller 44. The AI processors 38 are communicatively coupled to the computer controller 42 and to the robotic arm motion controller 44. In addition, the computer controller 42 is communicatively coupled to the robotic arm motion controller 44. The AI processor 38 analyzes the sensor data but it needs to be complemented by the computer controller 42, which performs the massive computation and data storage needed for the AI functioning of the robotic arm 20 (see FIG. 1). The computer controller 42 is a computer which is programmed to analyze the sensor data received from the robotic arm 20. Based on the results of the sensor data analysis, the robotic arm motion controller 44 performs computations to determine the proper motion in each of five degrees of freedom of the robotic arm 20, three of which are translational and two of which are rotational. For example, the end effector 28 may translate along mutually orthogonal X, Y and Z axes and may rotate about pitch and roll axes. This disclosure adopts the convention that the pitch angle is $\theta$ and the roll axis is $\phi$.

The AI processors 38 receive motion information from the robotic arm motion controller 44 and then process that motion information. More specifically, the AI processors 38 are programmed to perform special AI functions which enable the robotic arm 20 to perform automated operations derived by application of machine learning techniques without human intervention. The motion commands are separated into five electrical data streams, each at 20 Gbits/sec, and sent by the AI processors 38 to the transmitter of the 100-Gbit WDM transceiver 46. The five 20-Gbit/sec data streams include motion commands for respective motion actuators that actuate respective motions corresponding to the five degrees of freedom of the end effector 28.

In accordance with one embodiment, the end effector may include a spray nozzle and a paint supply. In this case, motion of the end effector 28 may be controlled to displace and aim the spray nozzle during an automated painting operation. For example, a robotic arm equipped with a spray nozzle may be used to paint the fuselage of an airplane. The sensor data from the sensors informs the AIPS 40 concerning current environmental conditions, which sensor data is then used to adapt the motions of the end effector to those environmental conditions. For example, the temperature for painting the front of the airplane will be different from the temperature at the tail of the airplane. Adjusting the spray painting speed of the robotic arm 20 as a function of sensed temperature will improve the paint quality and uniformity, reduce weight on the airplane, and eliminate the cost of repainting requests by airline customers.

In accordance with another embodiment, additional motion actuators may be incorporated in the end effector. For example, the end effector may include a gripper that includes two mutually opposed gripper fingers which are mechanically coupled to move concurrently in opposite directions (toward or away from each other). Commands for selectively opening and closing the gripper may be transmitted from the AIPS 40 to the motion actuator incorporated in the end effector 28 via the same GbPOF 50 that feeds motion commands to the motion actuators mounted to the distal arm link 26.

As the robotic arm moves to perform a programmed airplane production operation, the sensors will constantly feed back information to the AIPS for generating proper instantaneous motion instructions for the robot. This complex two-way communication is enabled by the pair of GbPOF 48 and 50 which extend the length of the robotic arm. The high durability of the GbPOF material enables the GbPOF to withstand the extreme robotic arm motions without degrading the 100-Gbit/sec optical data transmitted as the robotic arm 20 moves into positions that cause tight bending of and high stress in the GbPOF. For these extremely harsh motion conditions, glass-based optical fiber would be damaged or broken easily.

Figure 5:
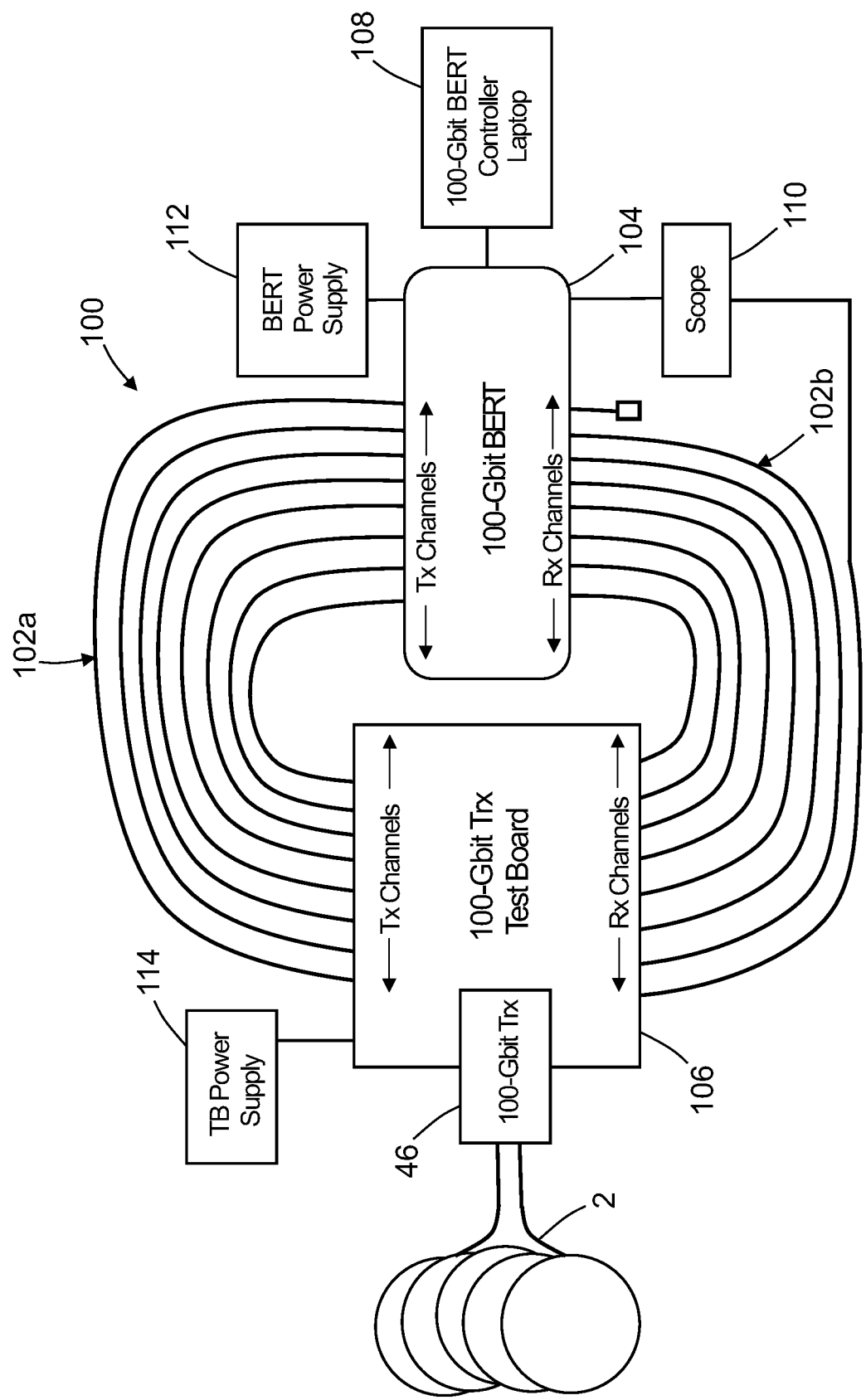
FIG. 5 is a block diagram identifying some components of a setup for testing the bit error rate of a GbPOF optical link during optical transfer of digital data at a total data rate of 100 Gbits/sec using four different wavelengths (the data rate at each wavelength being 25 Gbits/sec).

To substantiate the 100 Gbits/sec GbPOF communication capability, an experiment was conducted. The results of the experiment confirmed that data may be transmitted through 50 meters of Fontex GbPOF at a rate of 100 Gbits per second without any errors. FIG. 5 is a block diagram identifying some components of a setup 100 for testing the bit error rate of a GbPOF optical link 2 during optical transfer of digital data. A transceiver 46 having the capability to send and receive WDM optical data at a total rate of 100 Gbits/sec—which included four optical signals having different wavelengths each having a data rate of 25 Gbits/sec—was mounted to a test board 106. Electric power was provided to the transceiver 46 by the transceiver power supply 114. One end of the GbPOF 2 was optically coupled to the transmitter of transceiver 46, while the other end of the GbPOF 2 was optically coupled to the receiver of transceiver 46. The GbPOF 2 had a length of 50 meters. The transceiver 46 was configured to transmit and receive optical signals of different wavelengths on four separate channels. The four wavelengths used during the test were 850, 880, 910, and 940 nm.

The transmit channels of the test board 106 were connected to respective transmit channels of a bit error rate tester 104 (hereinafter "BERT 104") by means of phase-matched coaxial cables 102a; the receive channels of the test board 106 were connected to respective receive channels of BERT 104 by means of phase-matched coaxial cables 102b. Electric power was provided to the BERT 104 by the BERT power supply 112. The BERT 104 had the capability to transmit and receive electrical digital data in four channels each having a data rate capability of 25 Gbits/sec. The technician used a laptop computer 108 to interface with, configure, and control the BERT 104. An oscilloscope 110 was connected to display the signals received by the transceiver 106. The laptop computer 108 had a graphical user interface which displayed the bit error rate test results on a display screen. The experiment validated the feasibility of implementing a 100-Gbits/sec optical communication link inside the AI robotic arm system using GbPOF having a graded-index core made of a transparent carbon-hydrogen bond-free perfluorinated polymer with dopant.

Figure 6:
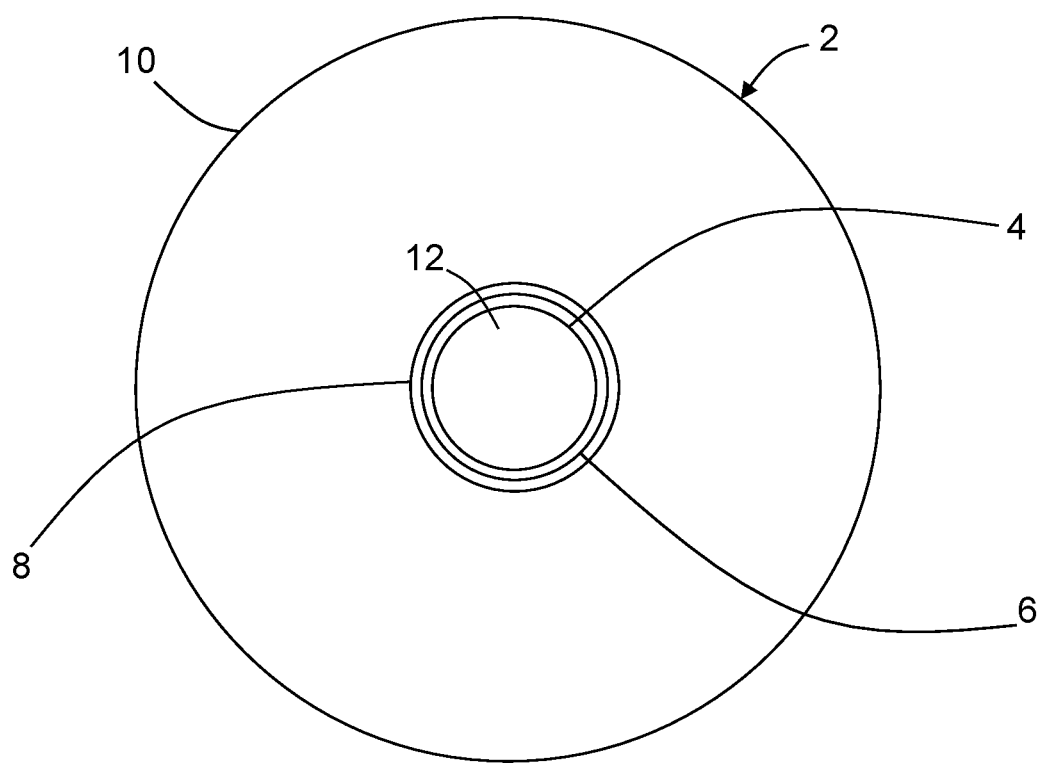
FIG. 6 is a diagram representing an end view of a typical gigabit plastic optical fiber. (The diameters of the respective components of the optical fiber are not drawn to scale.)

FIG. 6 is a diagram representing an end view of a typical GbPOF 2. (The diameters of the respective components of the optical fiber are not drawn to scale.) The GbPOF 2 includes a core 4, a first cladding 6, a second cladding 8, and a reinforcement layer 10. The first cladding 6 surrounds the core 4; the second cladding 8 surrounds the first cladding 6, and the reinforcement layer 10 surrounds the second cladding 8. The core 4 and cladding 6 are made of transparent carbon-hydrogen bond-free perfluorinated polymer. The reinforcement layer 10 may be made of fiber-reinforced plastic material. The end face 12 of GbPOF 2 is typically polished to form a defect-free planar surface.

While a robotic arm system having a high-throughput data transfer network that employs gigabit plastic optical fiber has been described with reference to various embodiments, it will be understood by those skilled in the art that various changes may be made and equivalents may be substituted for elements thereof without departing from the scope of the teachings herein. In addition, many modifications may be made to adapt the teachings herein to a particular situation without departing from the scope thereof. Therefore it is intended that the claims not be limited to the particular embodiments disclosed herein.

The embodiments disclosed above use one or more computer systems. As used in the claims, the term "computer system" may comprise a single processing or computing device or multiple processing or computing devices that communicate via wireline or wireless connections. A processing or computing device may include any one of the following: processor, a computer, a controller, a central processing unit, a microcontroller, a reduced instruction set computer processor, an application-specific integrated circuit, a programmable logic circuit, a field-programmable gated array, a digital signal processor, and/or any other circuit or processing device capable of executing the functions described herein.

The methods described herein may be encoded as executable instructions embodied in a non-transitory tangible computer-readable storage medium, including, without limitation, a storage device and/or a memory device. Such instructions, when executed by a processing or computing device, cause the device to perform at least a portion of the method described herein.

The method claims set forth hereinafter should not be construed to require that the steps recited therein be performed in alphabetical order (any alphabetical ordering in the claims is used solely for the purpose of referencing previously recited steps) or in the order in which they are recited unless the claim language explicitly specifies or states conditions indicating a particular order in which some or all of those steps are performed. Nor should the process claims be construed to exclude any portions of two or more steps being performed concurrently or alternatingly unless the claim language explicitly states a condition that precludes such an interpretation.

The invention claimed is:

1. A robotic arm system comprising:
an artificial intelligence (AI) processor system;
a transceiver electrically coupled to the AI processor system;
a robotic arm comprising an end effector, a transmitter, a first sensor electrically coupled to the transmitter, a receiver, a first motion actuator electrically coupled to the receiver, and an optical data communication network comprising a first gigabit plastic optical fiber which optically couples the transmitter to the transceiver and a second gigabit plastic optical fiber which optically couples the transceiver to the receiver, wherein:
each of the first and second gigabit plastic optical fiber is capable of supporting 100 gigabits per second;
the transmitter comprises a first transmit channel capable of converting electrical signals received from the first sensor into first optical signals having a first wavelength and a data rate of at least 20 gigabits per second;
the receiver comprises a first receive channel capable of converting first received optical signals having the first wavelength and a data rate of at least 20 gigabits per second into electrical signals sent to the first motion actuator;
the first sensor is configured to sense temperature of an environment in which a to-be-painted portion of a fuselage of an airplane resides;
the end effector comprises a spray nozzle and a paint supply, the spray nozzle being capable of spraying paint from the paint supply onto the to-be-painted portion of the fuselage; and
the AI processor system is programmed to control a speed of the spray nozzle during an automated painting operation as a function of the temperature sensed by the first sensor.

2. The robotic arm system as recited in claim 1, wherein:
the robotic arm comprises first through L-th arm links rotatably coupled in series and the end effector movably coupled to the L-th arm link, where L is an integer equal to or greater than 2;
the transmitter, first sensor, receiver, and first motion actuator are mounted to the L-th arm link; and
the first motion actuator is configured to actuate motion of the end effector relative to the L-th arm link.

3. The robotic arm system as recited in claim 1, wherein:
the robotic arm further comprises a second sensor which is electrically coupled to the transmitter and a second motion actuator which is electrically coupled to the receiver;
the transmitter further comprises a second transmit channel capable of converting electrical signals received from the second sensor into second optical signals having a second wavelength different than the first wavelength and a data rate of at least 20 gigabits per second; and
the receiver further comprises a second receive channel capable of converting second received optical signals having the second wavelength and a data rate of at least 20 gigabits per second into electrical signals sent to the second motion actuator.

4. The robotic arm system as recited in claim 3, wherein:
the transmitter further comprises an optical multiplexer optically coupled and configured to multiplex the first and second optical signals from the first and second transmit channels into the first gigabit plastic optical fiber; and
the receiver further comprises an optical de-multiplexer optically coupled and configured to de-multiplex the first and second received optical signals from the second gigabit plastic optical fiber into the first and second receive channels respectively.

5. The robotic arm system as recited in claim 1, wherein the first and second gigabit plastic optical fibers each have a graded-index core made of a transparent carbon-hydrogen bond-free perfluorinated polymer with dopant.

6. The robotic arm system as recited in claim 1, wherein the AI processor system is programmed to control the speed of the spray nozzle such that a first speed of the spray nozzle during automated painting of a front of the fuselage is different than a second speed of the spray nozzle during automated painting of a tail of the fuselage when a first temperature of a first environment in which the front of the fuselage resides is different than a second temperature of a second environment in which the tail of the fuselage resides.

7. A robotic arm system comprising:
a robotic arm comprising an end effector, a transmitter, first through M-th sensors electrically coupled to the transmitter, a receiver, and first through N-th motion actuators electrically coupled to the receiver, where M and N are integers equal to or greater than 2;
an AI processor system;
a transceiver electrically coupled to the AI processor system; and
an optical data communication network comprising a first gigabit plastic optical fiber which optically couples the transmitter to the transceiver and a second gigabit plastic optical fiber which optically couples the transceiver to the receiver, wherein:
each of the first and second gigabit plastic optical fiber is capable of supporting 100 gigabits per second;
the transmitter comprises first through M-th transmit channels capable of converting electrical signals respectively received from the first through M-th sensors into first through M-th optical signals having first through M-th wavelengths respectively and each having a data rate capability of at least 20 gigabits per second;
the receiver comprises first through N-th receive channels capable of converting first through N-th received optical signals having first through N-th wavelengths respectively into electrical signals sent to the first through N-th motion actuators, each of the first through N-th receive channels having a data rate capability of at least 20 gigabits per second;
the end effector comprises a spray nozzle and a paint supply, the spray nozzle being capable of spraying paint from the paint supply onto a to-be-painted portion of the fuselage;
the first sensor is configured to sense temperature of an environment in which the to-be-painted portion of a fuselage of an airplane resides; and
the AI processor system is programmed to control a speed of the spray nozzle during an automated painting operation as a function of the temperature sensed by the first sensor.

8. The robotic arm system as recited in claim 7, wherein:
the robotic arm comprises first through L-th arm links rotatably coupled in series and the end effector movably coupled to the L-th arm link, where L is an integer equal to or greater than 2;

the transmitter, first through M-th sensors, receiver, and first through N-th motion actuators are mounted to the M-th arm link; and the first through N-th motion actuators are configured to actuate respective motions of the end effector relative to the L-th arm link.

9. The robotic arm system as recited in claim 7, wherein the transceiver comprises:

first through N-th transceiver transmit channels capable of converting electrical signals received from the AI processor system into the first through N-th transmitted optical signals at a data rate of at least 20 gigabits per second per channel; and first through M-th transceiver receive channels capable of converting the first through M-th optical signals at a data rate of at least 20 gigabits per second per channel into electrical signals sent to the AI processor system.

10. The robotic arm as recited in claim 9, wherein:

each of the first through N-th transceiver transmit channels comprises a respective distributed feedback laser optically coupled to an optical multiplexer; and each of the first through M-th transceiver receive channels comprises a respective photodiode optically coupled to an optical de-multiplexer.

11. The robotic arm system as recited in claim 7, wherein:

the transmitter further comprises an optical multiplexer optically coupled and configured to multiplex the first through M-th optical signals from the first through M-th transmit channels into the first gigabit plastic optical fiber; and the receiver further comprises an optical de-multiplexer optically coupled and configured to de-multiplex the first through N-th received optical signals into the first through N-th receive channels respectively.

12. The robotic arm system as recited in claim 7, wherein the first and second gigabit plastic optical fibers each have a graded-index core made of a transparent carbon-hydrogen bond-free perfluorinated polymer with dopant.

13. The robotic arm system as recited in claim 7, wherein N equals five and the first through N-th wavelengths are 980, 1271, 1291, 1311, and 1331 nm respectively.

14. The robotic arm as recited in claim 7, wherein the first through M-th sensors comprise a proximity sensor, a tactile sensor, a temperature sensor, a humidity sensor, and a pressure sensor.

15. The robotic arm system as recited in claim 7, wherein the AI processor system is programmed to control the speed of the spray nozzle such that a first speed of the spray nozzle during automated painting of a front of the fuselage is different than a second speed of the spray nozzle during automated painting of a tail of the fuselage when a first temperature of a first environment in which the front of the fuselage resides is different than a second temperature of a second environment in which the tail of the fuselage resides.

16. A method for operating a robotic arm system, the method comprising:

acquiring sensor data using a multiplicity of sensors mounted to a robotic arm, wherein the sensor data includes temperature data indicating a temperature of an environment in which a to-be-painted portion of a fuselage of an airplane resides;

transmitting the temperature data from a transmitter incorporated in the robotic arm to an AI processor system external to the robotic arm via a first gigabit plastic optical fiber;

processing the temperature data using artificial intelligence to analyze the temperature data, compute robotic arm motion, and generate motion commands; and transmitting the motion commands from the AI processor system to a receiver incorporated in the robotic arm via a second gigabit plastic optical fiber, wherein each of the first and second gigabit plastic optical fiber is capable of supporting 100 gigabits per second, wherein processing the temperature data using artificial intelligence comprises generating motion commands which control a speed of a spray nozzle mounted to the robotic arm during an automated painting operation of the to-be-painted portion of the fuselage as a function of the temperature data.

17. The method as recited in claim 16, wherein the first and second gigabit plastic optical fibers each have a graded-index core made of a transparent carbon-hydrogen bond-free perfluorinated polymer with dopant.

18. The method as recited in claim 16, wherein:

the sensor data is transmitted through the first gigabit plastic optical fiber as a WDM optical signal having M wavelengths, where M is an integer equal to or greater than 2; and the motion commands are transmitted through the second gigabit plastic optical fiber as a WDM optical signal having N wavelengths, where N is an integer equal to or greater than 2.

19. The method as recited in claim 16, wherein the AI processor system is programmed to control the speed of the spray nozzle such that a first speed of the spray nozzle during automated painting of a front of the fuselage is different than a second speed of the spray nozzle during automated painting of a tail of the fuselage when a first temperature of a first environment in which the front of the fuselage resides is different than a second temperature of a second environment in which the tail of the fuselage resides.

* * * * *